(12) United States Patent
Yoon et al.

(10) Patent No.: US 12,263,766 B2
(45) Date of Patent: Apr. 1, 2025

(54) CHILD ANCHOR APPARATUS FOR VEHICLE

(71) Applicants: HYUNDAI MOTOR COMPANY, Seoul (KR); KIA CORPORATION, Seoul (KR); DAS CO., LTD, Gyeongju-si (KR)

(72) Inventors: Sang Hwi Yoon, Incheon (KR); Ga be Nam, Hwaseong-si (KR); Gil Ju Kim, Hwaseong-si (KR); Sung Hak Hong, Suwon-si (KR); Young Jae Sung, Ulsan (KR); Dong Cheol Park, Gyeongju-si (KR)

(73) Assignees: HYUNDAI MOTOR COMPANY, Seoul (KR); KIA CORPORATION, Seoul (KR); DAS CO., LTD, Gyeongju-si (KR)

( * ) Notice: Subject to any disclaimer, the term of this patent is extended or adjusted under 35 U.S.C. 154(b) by 155 days.

(21) Appl. No.: 18/135,869

(22) Filed: Apr. 18, 2023

(65) Prior Publication Data
US 2024/0174141 A1 May 30, 2024

(30) Foreign Application Priority Data
Nov. 25, 2022 (KR) .......................... 10-2022-0160349

(51) Int. Cl.
*B60N 2/28* (2006.01)
(52) U.S. Cl.
CPC ............. *B60N 2/2893* (2013.01); *B60N 2/28* (2013.01); *B60N 2/2806* (2013.01); *B60N 2/289* (2013.01)

(58) Field of Classification Search
CPC ...... B60N 2/2893; B60N 2/28; B60N 2/2806; B60N 2/289; B60N 2/2887; B60N 2/20
USPC ......... 297/463.1, 253, 256.1, 256.11, 256.16
See application file for complete search history.

(56) References Cited

U.S. PATENT DOCUMENTS

| | | | | |
|---|---|---|---|---|
| 5,918,934 | A | * | 7/1999 | Siegrist ................ B60N 2/2821 296/64 |
| 6,082,818 | A | * | 7/2000 | Muller ................... B60N 2/286 297/250.1 |
| 6,196,628 | B1 | * | 3/2001 | Goy ...................... B60N 2/2821 297/250.1 |
| 6,390,560 | B1 | * | 5/2002 | Gandhi ..................... B60N 2/28 297/253 |
| 6,547,329 | B2 | * | 4/2003 | Deptolla .............. B60N 2/2893 297/250.1 |
| 6,604,793 | B2 | * | 8/2003 | Habedank ............ B60N 2/2893 297/463.1 |

(Continued)

FOREIGN PATENT DOCUMENTS

| | | | | |
|---|---|---|---|---|
| JP | 2001063426 | A | * 3/2001 | ........... B60N 2/2893 |
| JP | 2001071798 | A | * 3/2001 | |

(Continued)

*Primary Examiner* — Robert Canfield
(74) *Attorney, Agent, or Firm* — MCDONNELL BOEHNEN HULBERT & BERGHOFF LLP

(57) ABSTRACT

A child anchor for a vehicle can be moved down and hidden in a seat by a user operating the apparatus with the seat changed into a full flat state, whereby it is possible to prevent contact between the child anchor and a passenger who takes a rest in the seat in the full flat state. Accordingly, there is an advantage that it is possible to improve convenience for a passenger who takes a rest.

14 Claims, 13 Drawing Sheets

(56) References Cited

U.S. PATENT DOCUMENTS

| | | | | |
|---|---|---|---|---|
| 7,338,121 | B1 * | 3/2008 | Pilcher | B60N 2/289 |
| | | | | 297/378.12 |
| 7,533,934 | B2 * | 5/2009 | Foelster | B60N 2/2893 |
| | | | | 297/253 |
| 10,220,735 | B1 * | 3/2019 | Nae | B60N 2/36 |
| 11,529,894 | B1 * | 12/2022 | Pearson | B60N 2/2887 |
| 2002/0008416 | A1 * | 1/2002 | Deptolla | B60N 2/2827 |
| | | | | 297/250.1 |
| 2004/0051356 | A1 * | 3/2004 | Neelis | B60N 2/2809 |
| | | | | 297/253 |
| 2004/0080193 | A1 * | 4/2004 | Tong | B60N 2/2893 |
| | | | | 297/250.1 |
| 2017/0080830 | A1 * | 3/2017 | Ruthinowski | B60N 2/933 |
| 2022/0203927 | A1 * | 6/2022 | Cech | B60N 2/2893 |

FOREIGN PATENT DOCUMENTS

| | | | | |
|---|---|---|---|---|
| JP | 2001080401 A | * | 3/2001 | B60N 2/2893 |
| KR | 2007-0031491 A | | 3/2007 | |
| WO | WO-2007031313 A1 | * | 3/2007 | B60N 2/22 |

* cited by examiner

CHILD ANCHOR APPARATUS FOR VEHICLE

CROSS REFERENCE TO RELATED APPLICATIONS

The present application claims priority to Korean Patent Application No. 10-2022-0160349, filed Nov. 25, 2022, the entire contents of which is incorporated herein for all purposes by this reference.

BACKGROUND

Field

The present disclosure relates to a child anchor apparatus for a vehicle and, more particularly, to a child anchor apparatus for a vehicle that is configured such that the vertical height thereof can be adjusted with a seat changed into a full flat state in a vehicle.

Description of the Related Art

A child seat is a seat for children that is additionally installed on a seat in a vehicle, and use of child seats is regulated under rules in some countries.

A child seat is generally installed at the rear seat in a vehicle, and to this end, child anchors that can fix a child seat are installed at the rear seat, and a child seat is fixed to a seat in a vehicle by fastening a latch of the child seat to a child anchor.

Meanwhile, the rear seats of vehicles for leisure (RV, SUV, MPV, etc.) is configured such that the seatback thereof can be fully reclined backward into a full flat state parallel with the seat cushion so that passengers can be comfortably take a rest, whereby such rear seats can be used as beds.

Even though such rear seats are changed into a full flat state, as described above, child anchors of the related art keep protruding upward, so there is a defect that passengers who take a rest feel uncomfortable due to contact with the child anchors, and if severe, passengers are injured by child anchors in some cases.

The description provided above as a related art of the present disclosure is just for helping understand the background of the present disclosure and should not be construed as being included in the related art known by those skilled in the art.

SUMMARY

An objective of the present disclosure is to provide a child anchor for a vehicle that is configured such that the vertical height thereof can be adjusted and that can be moved down to be hidden by a user with a rear seat changed into a full flat state, thereby preventing contact with a passenger who takes a rest in the rear seat in the full flat state so that convenience for the passenger can be improved.

In order to achieve the objectives, a child anchor apparatus for a vehicle of the present disclosure includes a fixed bracket fixed to a recliner frame, an anchor bracket installed to be movable up and down inside the fixed bracket and having a child anchor coupled thereto, and a height adjustment module installed inside the fixed bracket, connected to the anchor bracket, and configured to fix the anchor bracket at a predetermined position while allowing the anchor bracket to move in an up-down direction.

The recliner frame may be a frame connecting recliners positioned at left and right sides of a seat, respectively, and may be fixed at a predetermined position regardless of rotation of a seatback by operation of the recliners.

The fixed bracket may include two fixed brackets spaced apart from each other at left and right sides of the recliner frame; the anchor bracket and the height adjustment module may be disposed in the fixed brackets, respectively, and the two anchor brackets may be connected by a connection bracket to be simultaneously operated.

The height adjustment module may include a main housing positioned in the fixed bracket, having an upper end disposed through the anchor bracket, having an empty internal space, and having a guide hole extending in the up-down direction on an outer surface thereof, a height adjustment pin positioned in the main housing, having a protrusion protruding outside through the guide hole, and connected to the anchor bracket to move through the main housing; an operating cam disposed under the height adjust pin in contact with the height adjust pin, having a cam protrusion on an outer surface thereof, and rotating with respect to the main housing while moving in the up-down direction together with the height adjust pin, and an upper spring installed to be supported at both ends by the main housing and the height adjust pin, respectively, and a lower spring installed to support the operating cam.

The height adjustment module may further include a fixed cap fixed to the fixed bracket, coupled to a lower end of the main housing, and supporting a lower end of the lower spring.

Triangular projections may be formed on each of a bottom of the height adjustment pin and a top of the operating cam, and may be in contact with each other; and when the height adjustment pin is moved down, the operating cam may be rotated clockwise or counterclockwise while moving down with the height adjust pin by inclination of the triangular projections.

A stopper may be formed on an inner surface of the main housing; and when the operating cam is rotated by downward movement of the height adjustment pin, the cam protrusion may come in contact with the stopper, so the height adjustment pin and the operating cam may be fixed at downwardly moved positions.

As the height adjustment pin and the operating cam are moved down and then fixed, the child anchor may be moved down and hidden in a seat.

When the height adjustment pin and the operating cam are move downward with the cam protrusion in contact with the stopper, the cam protrusion may be released from the stopper by rotation of the operating cam, and the height adjustment pin and the operating cam fixed by the stopper may be released; and in this state, when an operating force is removed from the height adjustment pin, the height adjustment pin and the operating cam may be moved up through the main housing by a spring force of the lower spring and then fixed.

As the height adjustment pin and the operating cam are moved up and then fixed, the child anchor may be exposed outside a seat.

The guide hole of the main housing may include a plurality of guide holes, and the protrusion of the height adjustment pin may be formed in the same number as the guide holes and one protrusion may be inserted in each of the guide holes.

The upper spring and the lower spring may be compression coil springs that generate spring forces in opposite directions to each other.

The spring force of the lower spring may be larger than the spring force of the upper spring, so when an external force is not applied to the height adjustment pin, the height adjustment pin and the operating cam may remain moved up in the main housing by the spring force of the lower spring.

The child anchor may be moved down and hidden into a seat with rotation of a seatback when the seatback is rotated backward to change the seat into a full flat state; and the child anchor may be moved up with rotation of the seatback and exposed outside the seat when the seatback moved backward is rotated forward to be erected.

According to the child anchor apparatus for a vehicle of the present disclosure, the child anchor can be moved down and hidden in a seat by a user operating the apparatus with the seat changed into a full flat state, whereby it is possible to prevent contact between the child anchor and a passenger who takes a rest in the seat in the full flat state. Accordingly, there is an effect that it is possible to improve convenience for a passenger who takes a rest.

BRIEF DESCRIPTION OF THE FIGURES

The above and other objectives, features and other advantages of the present disclosure will be more clearly understood from the following detailed description when taken in conjunction with the accompanying drawings, in which.

DETAILED DESCRIPTION

Figure 1:
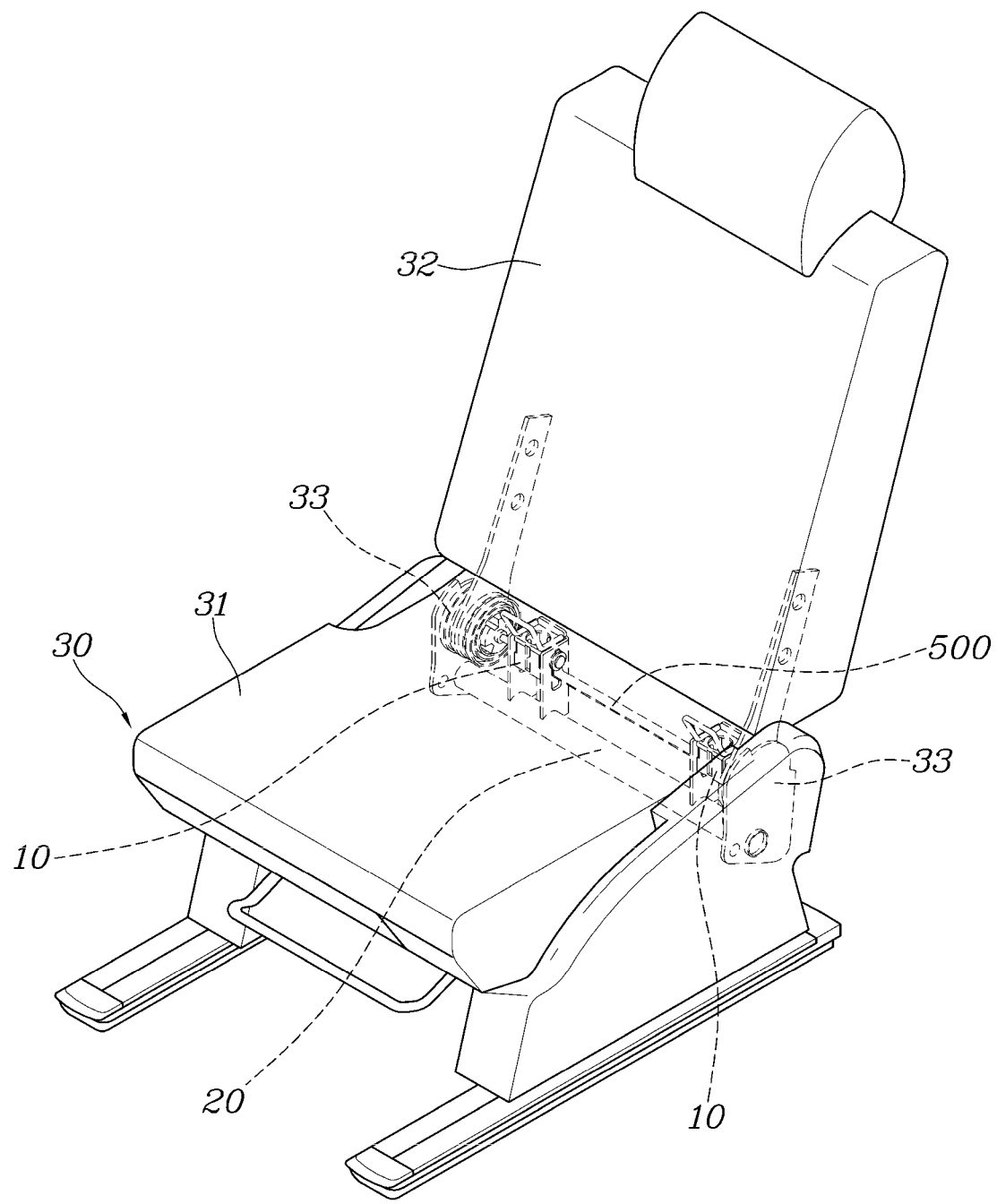
FIGS. 1 and 2 are views showing the state in which a child anchor is exposed outside a seat with a seatback erected in accordance with the present disclosure.

Hereafter, embodiments of the present disclosure will be described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted.

Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween.

On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

A unit or a control unit that included in names such as a motor control unit (MCU) and a hybrid control unit (HCU) is only a term that is generally used to name a controller that controls specific functions of a vehicle rather than meaning a generic function unit.

A controller may include a communication device that communicates with another controller or a sensor to control corresponding functions, a memory that stores an operating system or logic commands and input/output information, and one or more processors that perform determination, calculation, decision, etc. for controlling the corresponding functions.

A child anchor apparatus for a vehicle according to embodiments of the present disclosure is described hereafter in detail with reference to the accompanying drawings.

As shown in FIGS. 1 to 13, a child anchor apparatus 10 for a vehicle according to the present disclosure includes a fixed bracket 100 fixed to a recliner frame 20, an anchor bracket 300 installed to be movable up and down inside the fixed bracket 100 and having a child anchor 200 coupled thereto, and a height adjustment module 400 installed inside the fixed bracket 100, connected to the anchor bracket 300, and fixing the anchor bracket 300 at a predetermined position while allowing the anchor bracket 300 to move in the up-down direction.

In general, a rear seat 30 of a vehicle includes a seat cushion 31 and a seatback 32, and a child anchor 200 for installing a child seat is disposed at the joint of the rear end of the seat cushion 31 and the lower end of the seatback 32.

The child anchor 200 according to the present disclosure, which is installed using the fixed bracket 100, the anchor bracket 300, and the height adjustment module 400, enables a child seat to be easily installed by being exposed outside a seat in a normal state in which the seatback 32 is erect, and is hidden in the seat in a full flat state in which the seatback 32 has been rotated backward to be level with the seat cushion 31, thereby improving convenience for a user.

The seatback 32 can be rotated forward and backward by operation of a recliner 33, one recliner 33 is provided at each of the left and right sides of the seat, and the recliner frame 20 on which the fixed bracket 100 is installed is a circular rod shape frame connecting the recliners 33 positioned at the left and right sides of the seat.

The recliner frame 20 is always fixed at a predetermined position regardless of rotation of the seatback 32 by operation of the recliners 33.

According to the present disclosure, two fixed brackets 100 are provided and spaced apart from each other at the left and right sides of the recliner frame 20. Further, two anchor brackets 300 and two height adjustment modules 400 are also provided and are each disposed inside respective fixed brackets 100. The two anchor bracket 300 are connected by a connection bracket 500 to simultaneously operate.

The anchor brackets 300 and the connection bracket 500 are coupled by bolts 600 and the bolts 600 are fastened to the anchor brackets 300 through the fixed brackets 100.

The anchor bracket 300 is supposed to be movable downward when an external force is applied and to be movable downward by a spring force when an external force is removed in the fixed bracket 100. To this end, guide holes 110 extending in the up-down direction for movement of the bolts 600 are formed at the fixed bracket 100.

The height adjustment module 400 includes: a fixed cap 410 coupled to be fixed inside the fixed bracket 100, a main housing 420 coupled to the fixed cap 410 at the lower end, having an upper end disposed through the anchor bracket 300, having an empty internal space, and having a guide hole 421 extending in the up-down direction on the outer surface, a height adjustment pin 430 positioned in the main housing 420, having a protrusion 431 protruding outside through the guide hole 421, and connected to the anchor bracket 300 to move through the main housing 420, an operating cam 440 disposed under the height adjust pin 430 in contact with the height adjust pin 430, having a cam protrusion 441 on the outer surface, and rotating with respect to the main housing 420 while moving in the up-down direction together with the height adjust pin 430, and an upper spring 450 installed to be supported at both ends by the main housing 420 and the height adjust pin 430, respectively, and a lower spring 460 installed to be supported at both ends by the fixed cap 410 and the operating cam 440.

The main housing 420 has a cylindrical shape having a closed top and an open bottom and a plurality of guide holes 421 extending in the up-down direction and being open downward is formed on the outer surface of the main housing 420.

It is exemplified that three guide holes 421 are formed and arranged circumferentially with gaps of 120 degrees, but the present disclosure is not limited thereto.

The open bottom of the main housing 420 is coupled to the fixed cap 410, thereby being closed.

The fixed cap 410 is fixed inside the fixed bracket 100, the upper end of the main housing 420 passes through the anchor bracket 300, and the child anchor 200 is coupled to the anchor bracket 300.

Accordingly, when a user presses the child anchor 200, the anchor bracket 300 is moved down through the main housing 420, whereby the child anchor 200 is also moved down.

The height adjustment pin 430 and the operating cam 440 are installed in the main housing 420, and in this embodiment, the protrusion 431 of the height adjustment pin 430 is formed in the same number as the guide holes 421 of the main housing 420, so one protrusion 431 is inserted in each guide hole 421.

The guide holes 421 and the protrusions 431 serve to guide vertical (up-down) movement of the height adjust pin 430, and particularly, the protrusions 431 also serve to connect the anchor bracket 300 and the height adjustment pin 430 to each other, so the anchor bracket 300 and the height adjustment pin 430 can move up and down together.

Triangular projections 432 and 442 are formed on the bottom of the height adjustment pin 430 and the top of the operating cam 440, respectively, and are in contact with each other, whereby when the height adjustment pin 430 is moved down, the operating cam 440 is rotated clockwise or counterclockwise while moving down with the height adjust pin 430 by the inclination of the triangular projections 432 and 442.

It is exemplified in the drawings of the present disclosure that the operating cap 440 is rotated counterclockwise.

A stopper 422 is formed on the inner surface of the main housing 420, so when the cam protrusion 441 comes in contact with the stopper 422 while the operating cam 440 is rotated by downward movement of the height adjustment pin 430, the height adjustment pin 430 and the operating cam 440 are fixed at the downwardly moved positions. Further, when the height adjustment pin 430 and the operating cam 440 are fixed at the downwardly moved positions, the child anchor 200 is moved down and hidden in the seat.

When the height adjustment pin 430 and the operating cam 440 are moved downward with the cam protrusion 441 in contact with the stopper 422, the cam protrusion 441 is released from the stopper 422 by rotation of the operating cam 440, and the height adjustment pin 430 and the operating cam 440 fixed by the stopper 422 are released. In this state, when the operating force is removed from the height adjustment pin 430, the height adjustment pin 430 and the operating cam 440 are moved up through the main housing 420 by the spring force of the lower spring 460 and then fixed. Further, when the height adjustment pin 430 and the operating cam 440 are moved up and then fixed, the child anchor 200 is exposed outside the seat.

The upper spring 450 and the lower spring 460 according to the present disclosure are compression coil springs that generate spring forces in opposite directions to each other, but the present disclosure is not limited thereto.

The spring force of the lower spring 460 is larger than the spring force of the upper spring 450, so when an external force is not applied to the height adjustment pin 430, the height adjustment pin 430 and the operating cam 440 remain moved up in the main housing 420 by the spring force of the lower spring 460, whereby the child anchor 200 remains exposed outside the seat.

An embodiment of the present disclosure is fundamentally configured such that when a user fully rotates backward the seatback 32 into a full flat state to be level with the seat cushion 31 and then presses and moves down the child anchor 200, the child anchor 200 is hidden in the seat.

However, if necessary, the child anchor 200 may be configured to operate with rotation of the seatback 32 for the convenience of a user.

That is, the child anchor 200 may be moved down and hidden into the seat with rotation of the seatback 32 when the seatback 32 is rotated backward to change the seat into a full flat state, and on the contrary, the child anchor 200 may be moved up with rotation of the seatback 32 and exposed outside the seat when the seatback 320 moved backward is rotated forward to be erected.

Hereafter, operation of the child anchor apparatus 10 according to the present disclosure is described.

Figure 2:
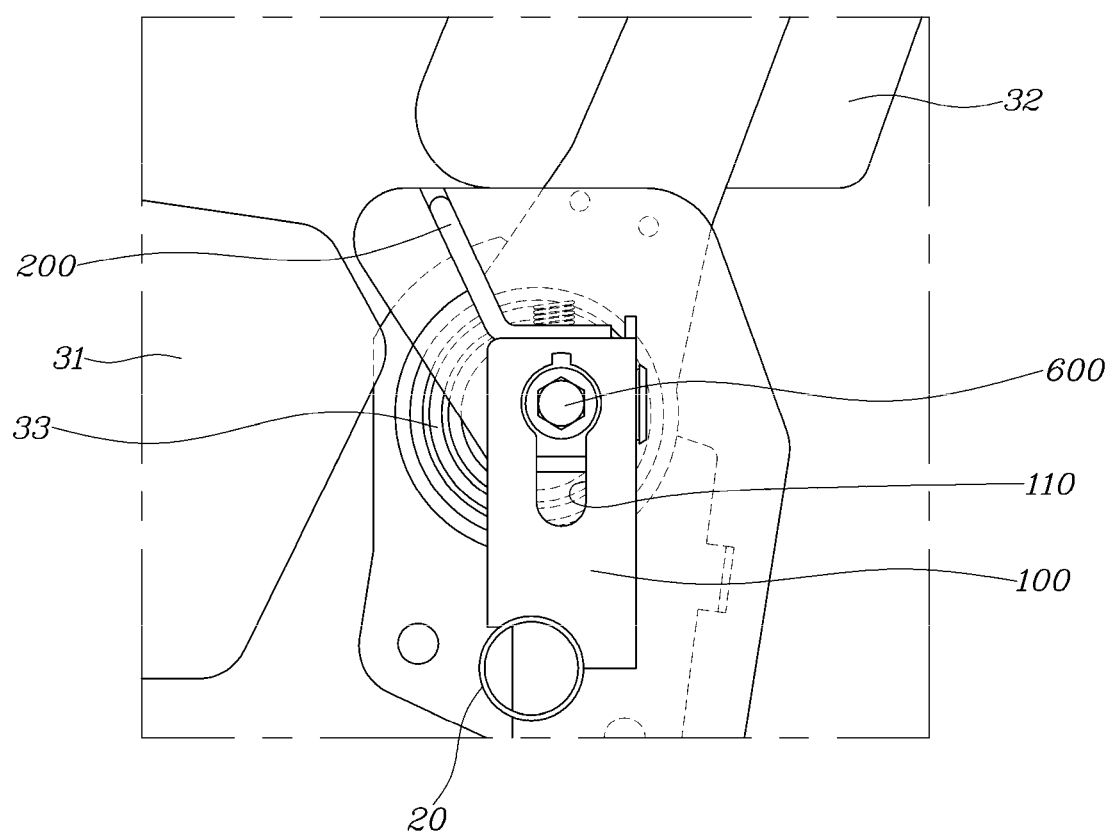
Figure 3:
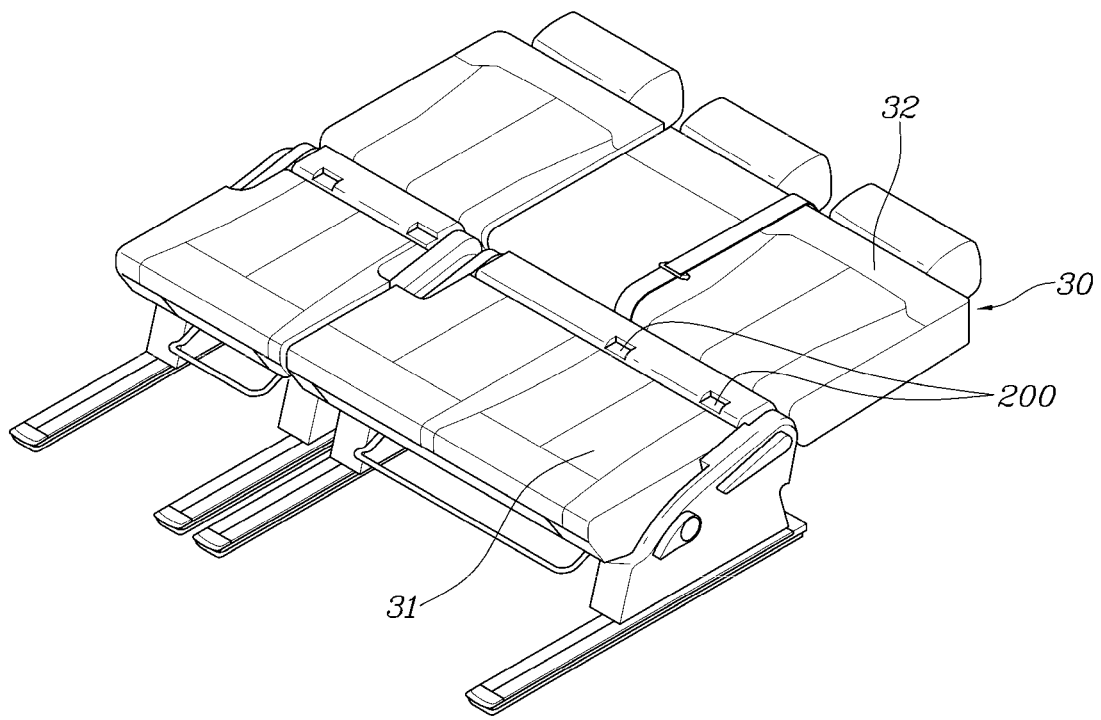
FIGS. 3 and 4 are views showing the state in which a child anchor is hidden in a seat that is in a full flat state.
Figure 4:
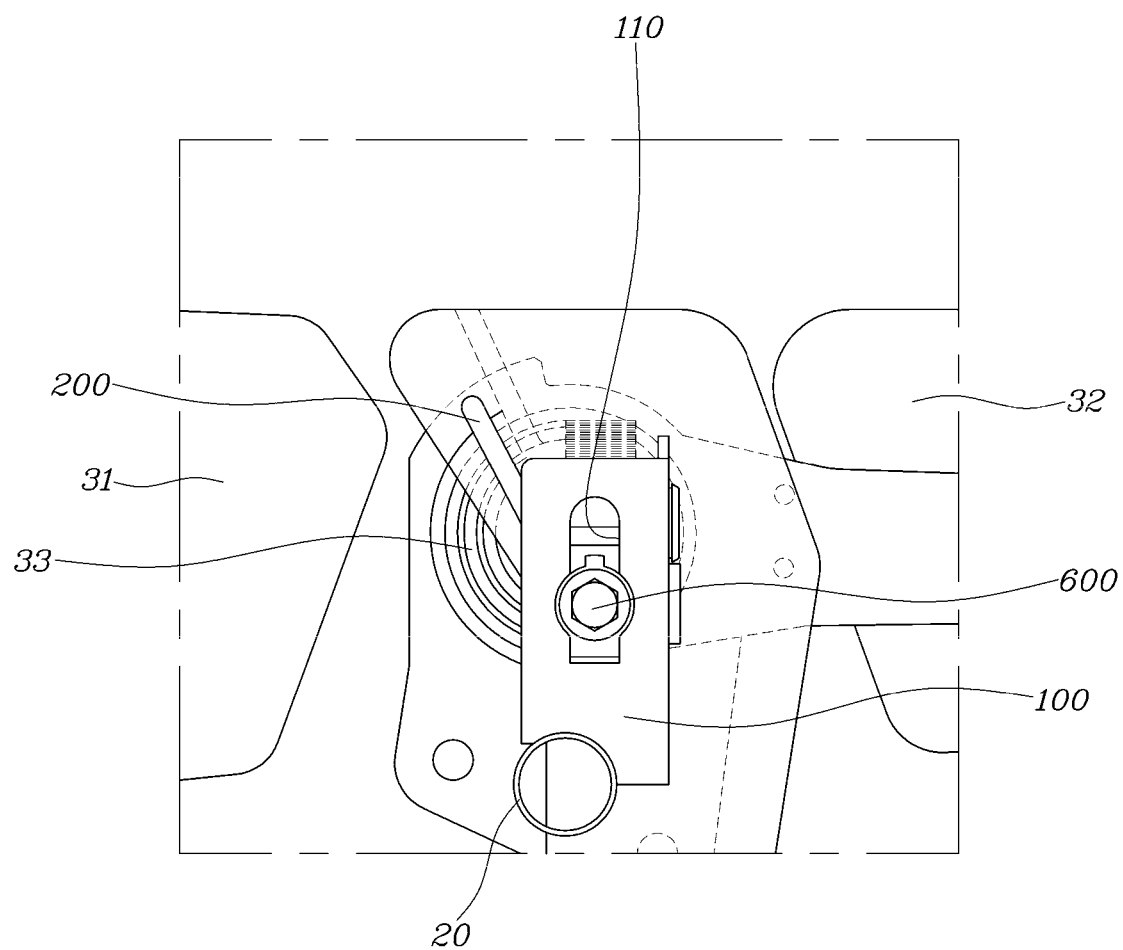
Figure 5:
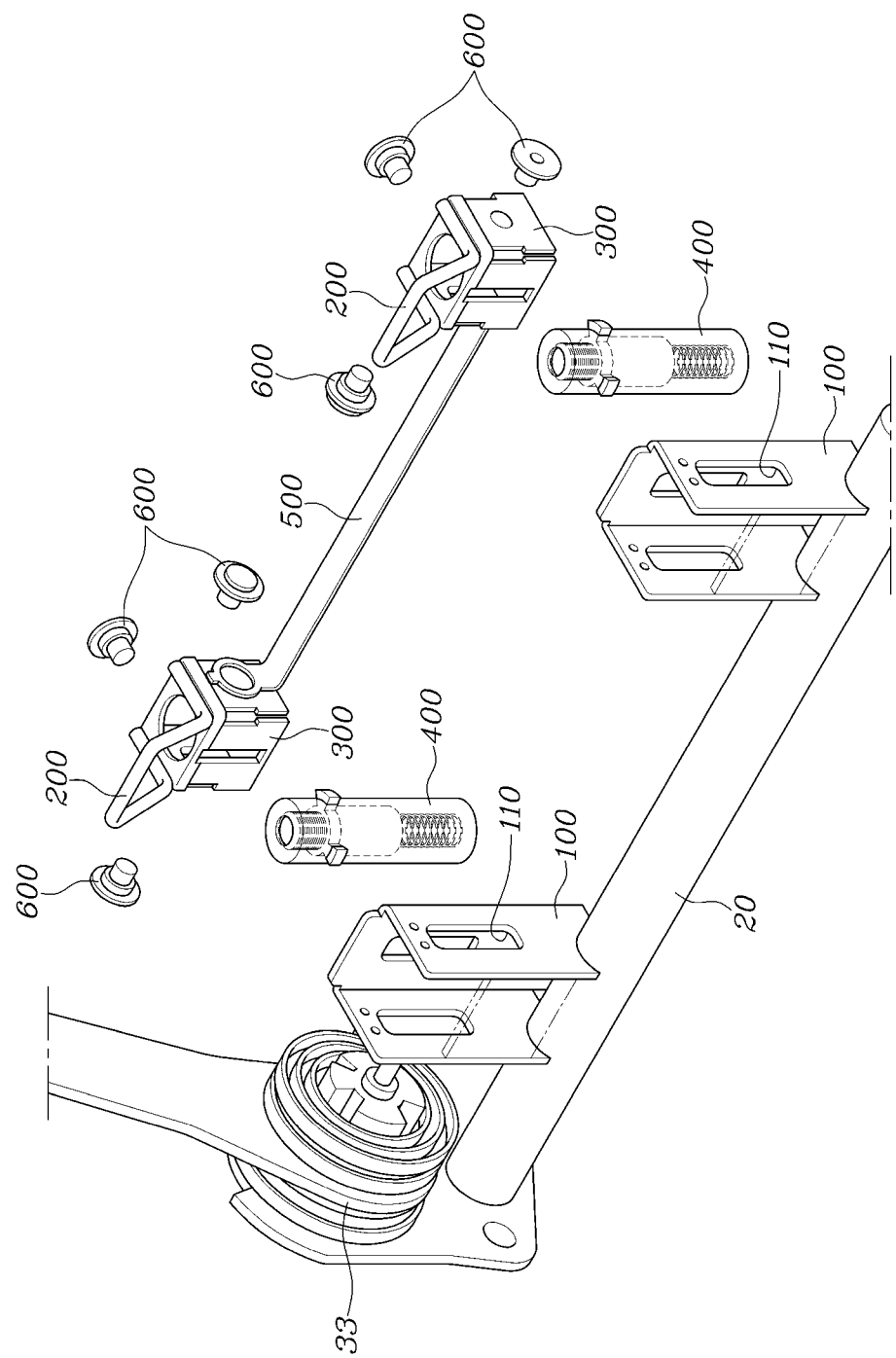
FIG. 5 is an exploded view of a child anchor apparatus according to the present disclosure.
Figure 6:
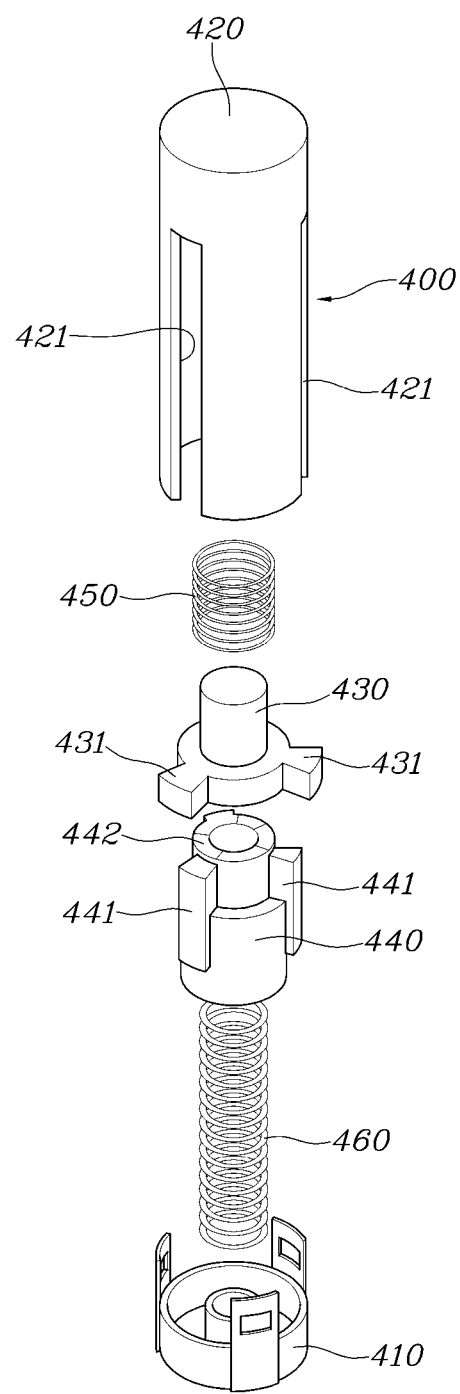
FIG. 6 is an exploded view of a height adjustment module according to the present disclosure.
Figure 7:
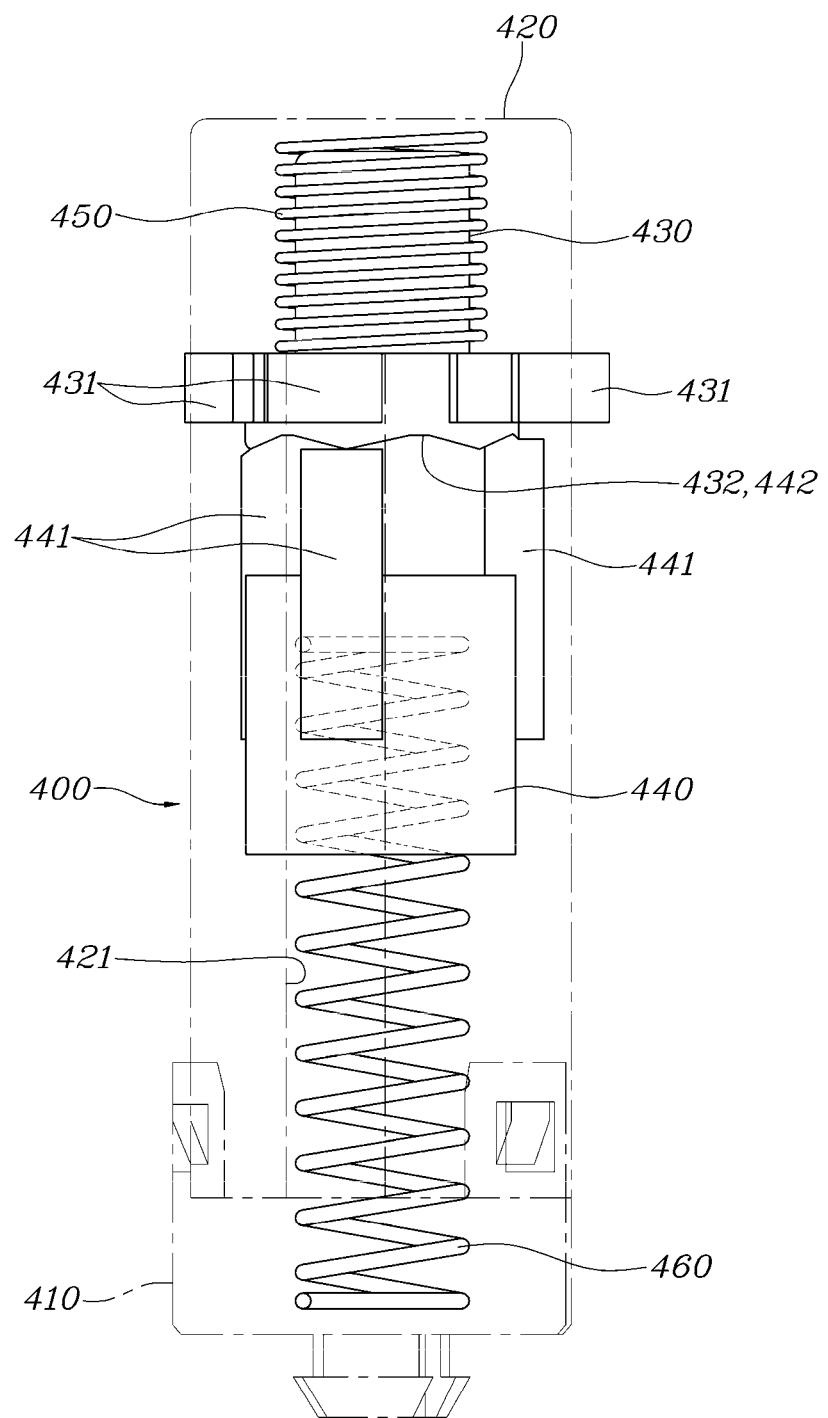
FIG. 7 is an assembly view of FIG. 6.
Figure 8:
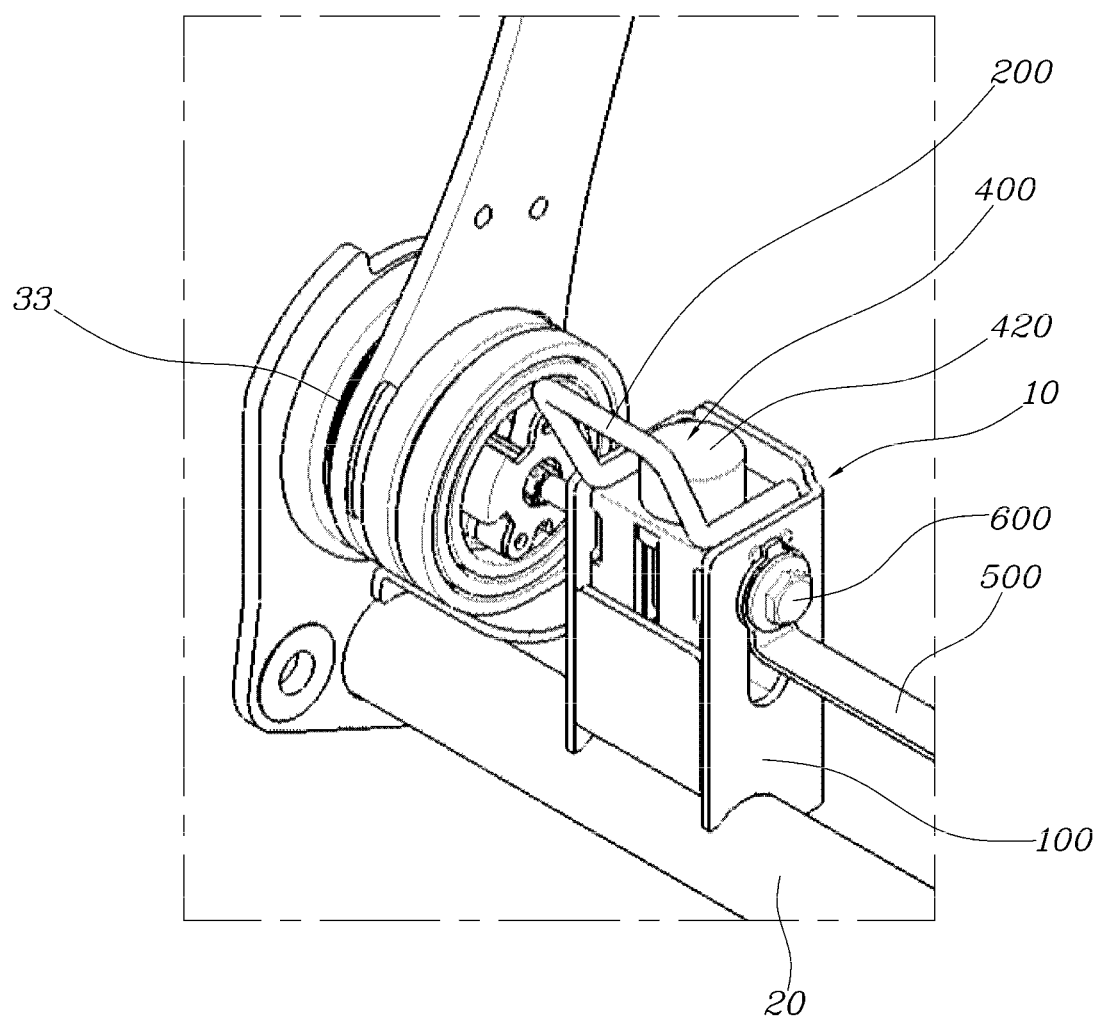
FIG. 8 is a view of the child anchor apparatus in the state of FIG. 1.

The seatback 32 is normally erect in FIGS. 1, 2, and 8, and in this state, the child anchor 200 is normally exposed outside the seat and a user can normally install and use a child seat on the seat in the vehicle using the child anchor 200.

Figure 9:
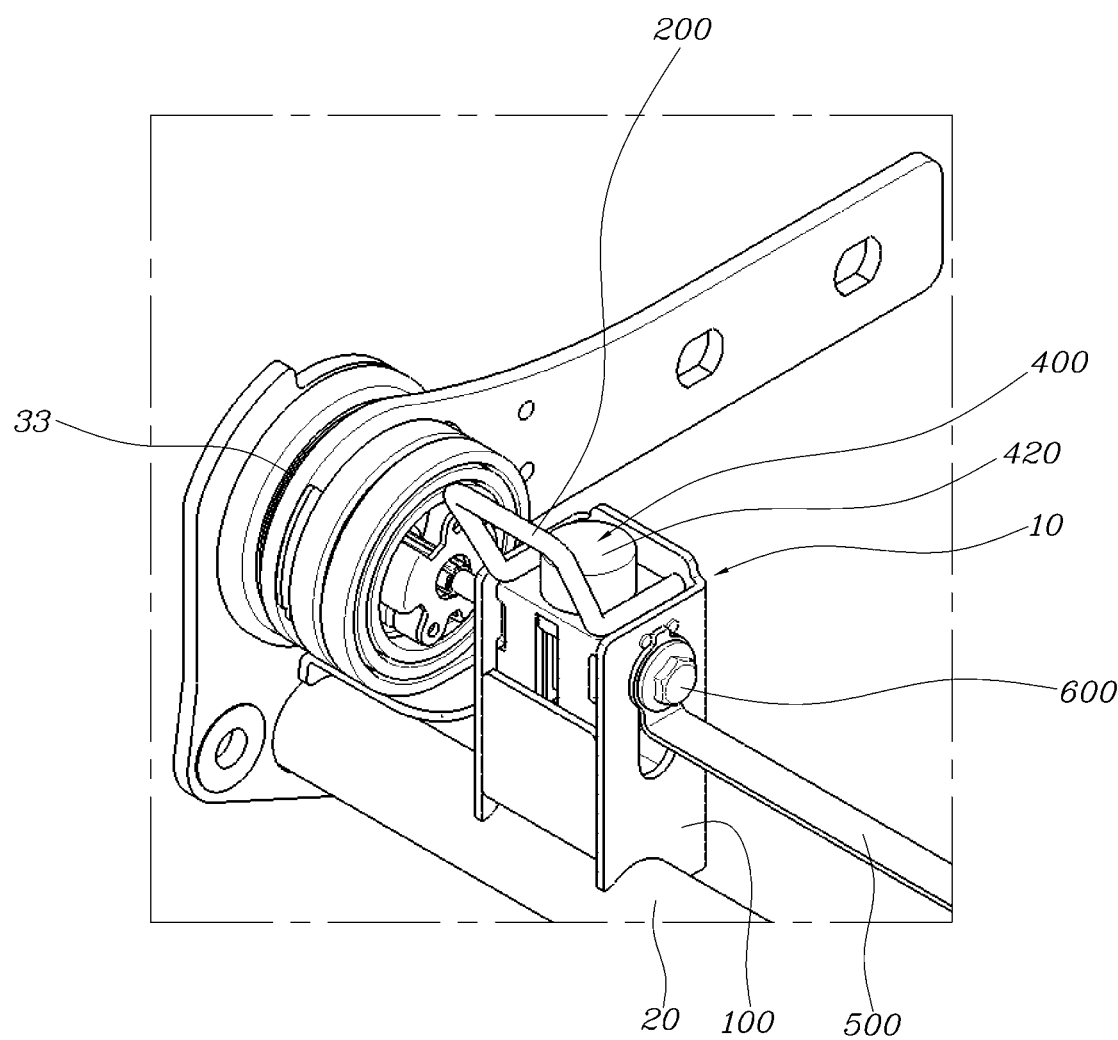
FIG. 9 is a view of the child anchor apparatus when a seat back has been fully rotated backward in a full flat state by operation of a recliner.

FIG. 9 shows a full flat state of the seat in which the seatback 32 has be fully rotated backward by a user operating the recliner, so the seat cushion 31 and the seatback 32 are level with each other.

In the states shown in FIGS. 8 and 9, the height adjustment module 400 is in an initial state before operation.

Figure 10:
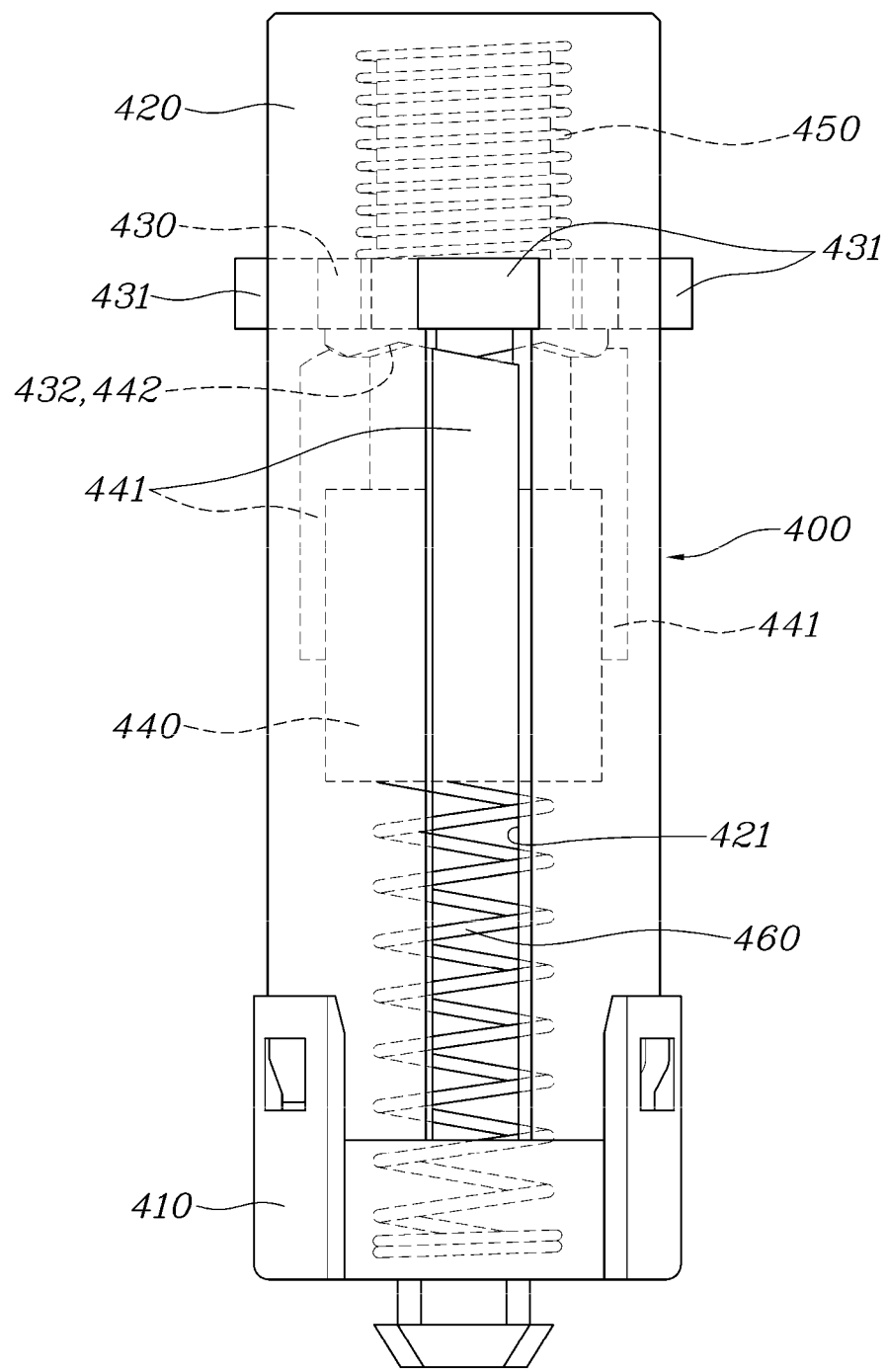
FIG. 10 is a view of the height adjustment module in the states of FIGS. 8 and 9.

In the initial state of the height adjustment module 400 before operation, as shown in FIG. 10, the height adjustment pin 430 and the operating cam 440 have been moved up and then fixed inside the main housing 420 by the spring force of the lower spring 460, whereby the anchor bracket 300 has been moved up with respect to the fixed bracket 100 and the child anchor 200 coupled to the anchor bracket 300 has been exposed outside the seat.

Figure 11:
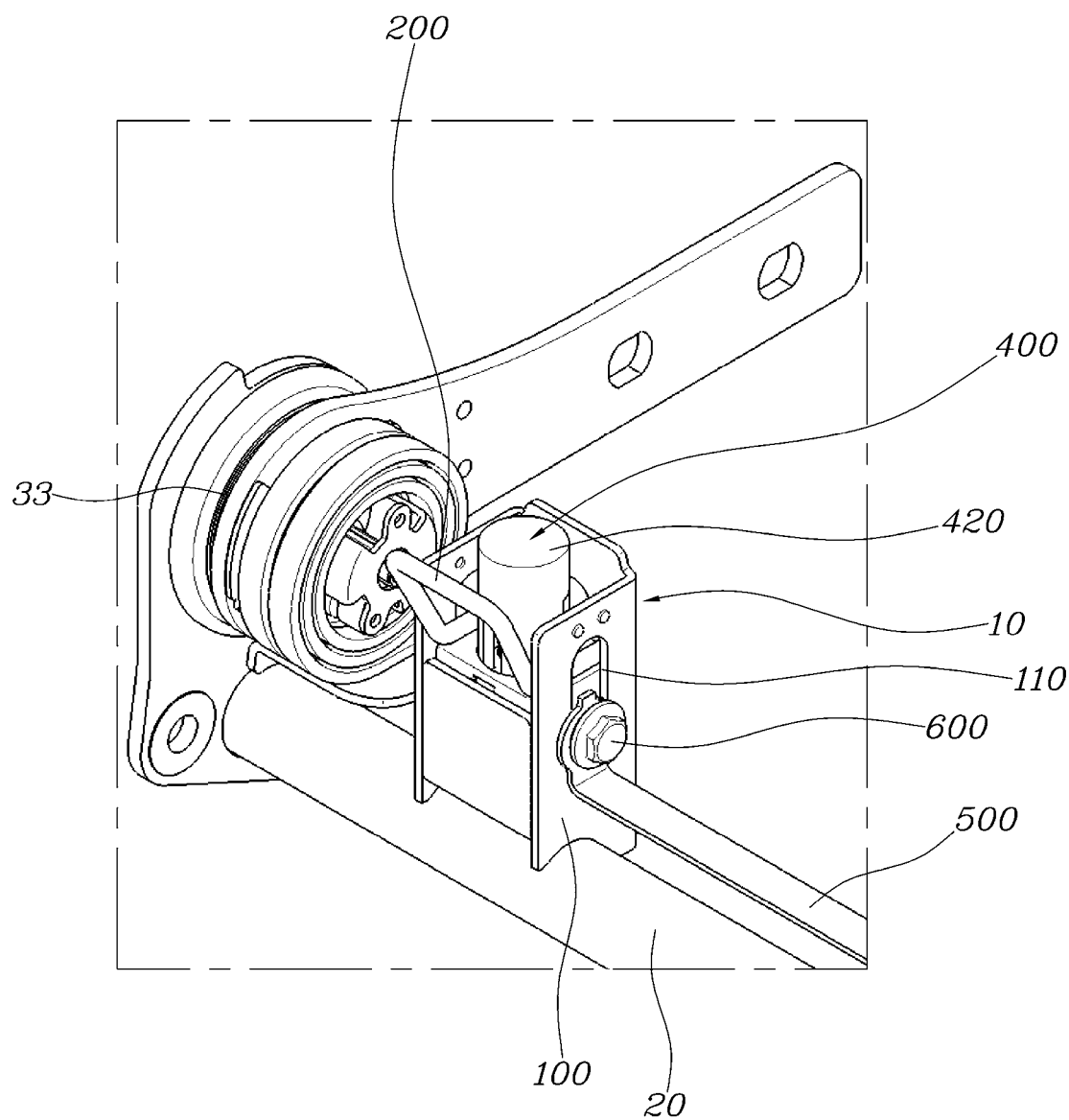
FIG. 11 is a view showing the state in which the child anchor has been pressed and moved down in FIG. 9.
Figure 12:
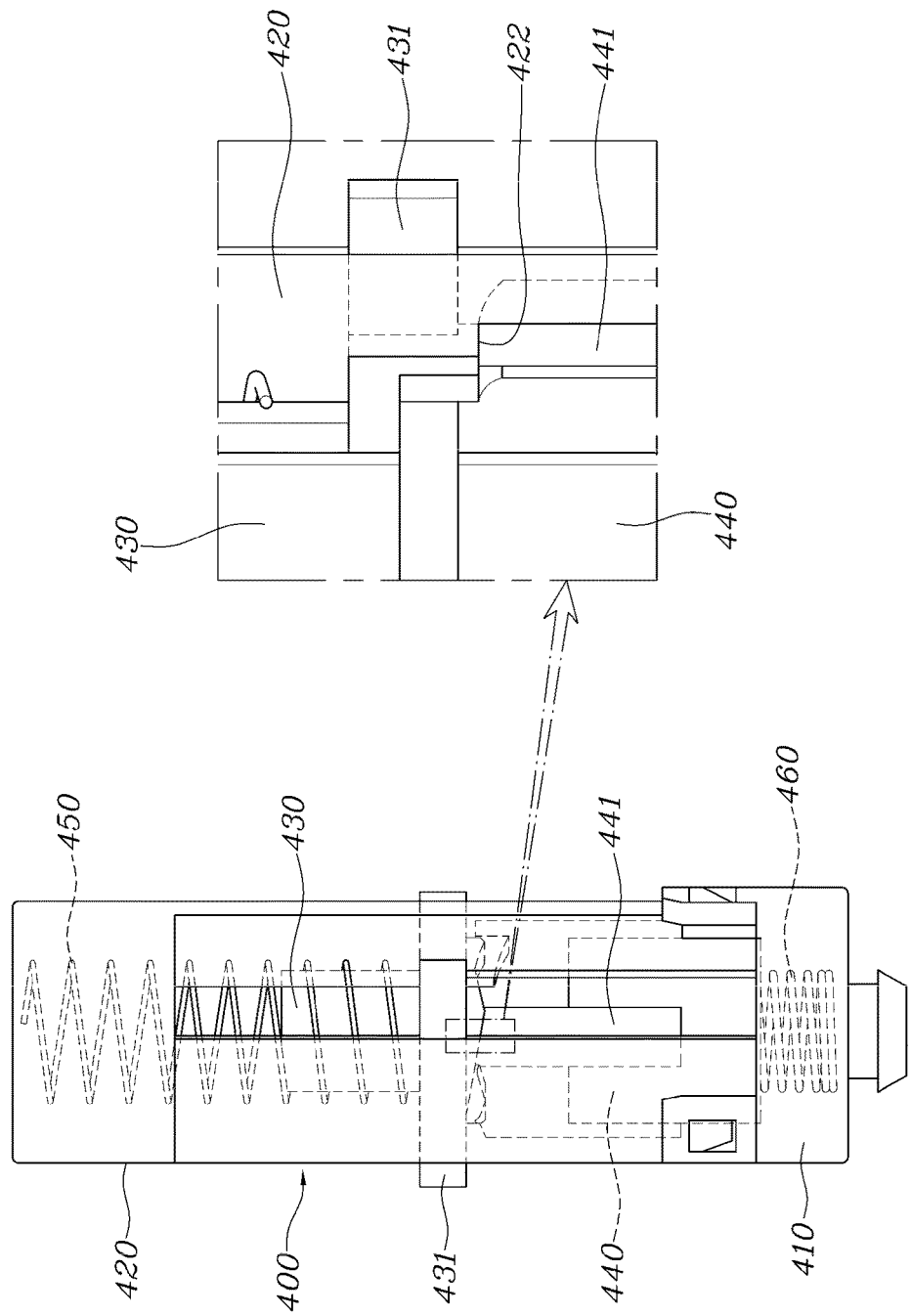
FIG. 12 is a view of the height adjustment module in the state of FIG. 11.

FIGS. 11 and 12 show the state in which a user has operated the height adjustment module 400 by pressing down the child anchor 200 after changing the seat into a full flat state.

In the state shown in FIG. 9, when a user presses down the child anchor 200, the anchor bracket 300 is moved downward inside the fixed bracket 100, simultaneously, the height adjustment pin 430 connected to the anchor bracket 300 is also moved downward, and the operating cam 440 connected to the height adjustment pin 430 is rotated counterclockwise while moving down by the inclination of the triangular projections 432 and 442.

When the operating cam 440 is rotated counterclockwise, the cam protrusion 441 of the operating cam 440 comes in contact with the stopper 422 of the main housing 420, and the height adjustment pin 430 and the operating cam 440 are moved down and then fixed at the position. As a result, since the height adjustment pin 430 and the operating cam 440 are moved down and then fixed at the position, the child anchor 200 is moved down and hidden in the seat.

When the child anchor 200 is hidden in the seat changed into a full flat state, it is possible to prevent the situation in which the child anchor 200 protrudes upward from the seat, so it is possible to prevent contact between the child anchor 200 and a passenger who takes a rest in the rear seat in the full flat state, whereby it is possible to improve convenience for a passenger who takes a rest.

Figure 13:
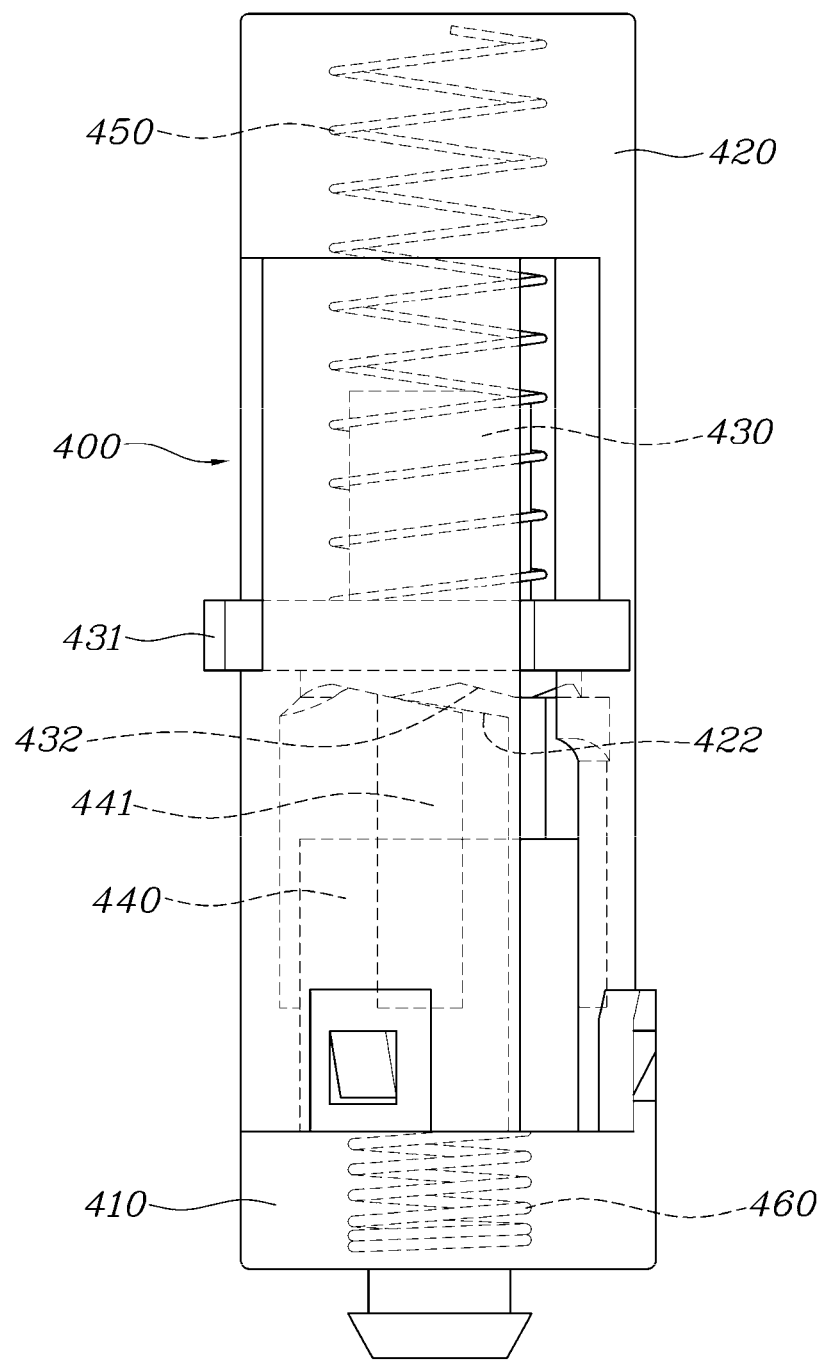
FIG. 13 is a view showing the state in which a cam projection is out of a stopper by rotation of an operating cam when a height adjust pin and the operating cam are further moved down in FIG. 12.

After the height adjustment pin 430 and the operating cam 440 are moved down and fixed at the position due to contact of the cam protrusion 441 with the stopper 442, when a user further moves down the height adjustment pin 430 and the operating cam 440 by further pressing the child anchor 200, as shown in FIG. 13, the cam protrusion 441 is released from the stopper 422 by counterclockwise rotation of the operating cam 440.

When the cam protrusion 441 is released from the stopper 422, the height adjustment pin 430 and the operating cam 440 fixed by the stopper 422 are released. In this state, when the operating force applied to the child anchor 200 by the user is removed, the height adjustment pin 430 and the operating cam 440 are moved upward through the main housing 420 by the spring force of the lower sprint 460 and then fixed. Further, when the height adjustment pin 430 and the operating cam 440 are moved up and then fixed, as shown in FIGS. 2 and 8, the child anchor 200 is exposed again outside the seat.

According to the child anchor apparatus for a vehicle of the present disclosure described above, the child anchor 200 can be moved down and hidden in a seat by a user operating the apparatus with the seat changed into a full flat state, whereby it is possible to prevent contact between the child anchor 200 and a passenger who takes a rest in the seat in the full flat state. Accordingly, there is an advantage that it is possible to improve convenience for a passenger who takes a rest.

Although the present disclosure was described with reference to specific embodiments shown in the drawings, it is apparent to those skilled in the art that the present disclosure may be changed and modified in various ways without departing from the scope of the present disclosure which is described in the following claims.

The invention claimed is:

1. A child anchor apparatus for a vehicle, the apparatus comprising:
   a fixed bracket fixed to a recliner frame;
   an anchor bracket movable up and down inside the fixed bracket;
   a child anchor coupled to the anchor bracket; and
   a height adjustment module positioned inside the fixed bracket, connected to the anchor bracket, and configured to fix the anchor bracket at a predetermined position while allowing the anchor bracket to move in a vertical direction;
   wherein the fixed bracket includes two fixed brackets spaced apart from each other at a left side of the recliner frame and a right side of the recliner frame;
   wherein the anchor bracket and the height adjustment module are disposed in each of the two fixed brackets; and
   wherein the anchor bracket includes two anchor brackets connected by a connection bracket to be simultaneously operated.

2. The child anchor apparatus of claim 1, wherein the recliner frame is a frame connecting a first recliner positioned at a left side of a seat and second recliner positioned at a right side of the seat, and wherein the recliner frame is fixed at a predetermined position regardless of rotation of a seatback by operation of the first and second recliners.

3. The child anchor apparatus of claim 1, wherein the height adjustment module includes:
   a main housing positioned in the fixed bracket, the main housing having an upper end disposed through the anchor bracket, having an empty internal space, and having a guide hole extending in the vertical direction on an outer surface;
   a height adjustment pin positioned in the main housing, the height adjustment pin having a protrusion protruding outside through the guide hole, and connected to the anchor bracket to move through the main housing;
   an operating cam disposed under the height adjust pin in contact with the height adjust pin, the operating cam having a cam protrusion on an outer surface, and configured to rotate with respect to the main housing while moving in the vertical direction together with the height adjust pin; and
   an upper spring supported at one end by the main housing and supported at an other end by the height adjust pin, and a lower spring supporting the operating cam.

4. The child anchor apparatus of claim 3, wherein the height adjustment module further includes a fixed cap fixed to the fixed bracket, coupled to a lower end of the main housing, and supporting a lower end of the lower spring.

5. The child anchor apparatus of claim 3, wherein triangular projections are formed on each of a bottom of the height adjustment pin and a top of the operating cam, and are in contact with each other; and
when the height adjustment pin is moved down, the operating cam is rotated clockwise or counterclockwise while moving down with the height adjust pin by inclination of the triangular projections.

6. The child anchor apparatus of claim 3, wherein a stopper is formed on an inner surface of the main housing; and
when the operating cam is rotated by downward movement of the height adjustment pin, the cam protrusion comes in contact with the stopper, so the height adjustment pin and the operating cam are fixed at downward positions.

7. The child anchor apparatus of claim 6, wherein as the height adjustment pin and the operating cam are moved down and fixed, the child anchor is moved down and hidden in a seat.

8. The child anchor apparatus of claim 6, wherein when the height adjustment pin and the operating cam are move downward with the cam protrusion in contact with the stopper, the cam protrusion is released from the stopper by rotation of the operating cam, and the height adjustment pin and the operating cam fixed by the stopper are released; and then, when an operating force is removed from the height adjustment pin, the height adjustment pin and the operating cam are moved up through the main housing by a spring force of the lower spring, and then fixed.

9. The child anchor apparatus of claim 8, wherein as the height adjustment pin and the operating cam are moved up and then fixed, the child anchor is exposed outside a seat.

10. The child anchor apparatus of claim 3, wherein the guide hole of the main housing includes a plurality of guide holes; and
the protrusion of the height adjustment pin includes a plurality of protrusions, the number of protrusions being equal to the number of guide holes, and one protrusion is inserted in each of the guide holes.

11. The child anchor apparatus of claim 3, wherein the upper spring and the lower spring are compression coil springs that generate spring forces in opposite directions to each other.

12. The child anchor apparatus of claim 3, wherein the spring force of the lower spring is larger than the spring force of the upper spring, so when an external force is not applied to the height adjustment pin, the height adjustment pin and the operating cam remain moved up in the main housing by the spring force of the lower spring.

13. The child anchor apparatus of claim 1, wherein the child anchor is moved down and hidden into a seat with rotation of a seatback when the seatback is rotated backward to change the seat into a full flat state; and the child anchor is moved up with rotation of the seatback and exposed outside the seat when the seatback moved backward is rotated forward to be erected.

14. A child anchor apparatus for a vehicle, the apparatus comprising:
a fixed bracket fixed to a recliner frame;
an anchor bracket movable up and down inside the fixed bracket;
a child anchor coupled to the anchor bracket; and
a height adjustment module positioned inside the fixed bracket, connected to the anchor bracket, and configured to fix the anchor bracket at a predetermined position while allowing the anchor bracket to move in a vertical direction;
wherein the height adjustment module includes:
a main housing positioned in the fixed bracket, the main housing having an upper end disposed through the anchor bracket, having an empty internal space, and having a guide hole extending in the vertical direction on an outer surface;
a height adjustment pin positioned in the main housing, the height adjustment pin having a protrusion protruding outside through the guide hole, and connected to the anchor bracket to move through the main housing;
an operating cam disposed under the height adjust pin in contact with the height adjust pin, the operating cam having a cam protrusion on an outer surface, and configured to rotate with respect to the main housing while moving in the vertical direction together with the height adjust pin; and
an upper spring supported at one end by the main housing and supported at an other end by the height adjust pin, and a lower spring supporting the operating cam.

* * * * *